No. 641,253.  
C. H. AMIDON.  
AIR PUMP FOR PNEUMATIC TIRES.  
(Application filed May 1, 1899.)  
(No Model.)  
Patented Jan. 16, 1900.
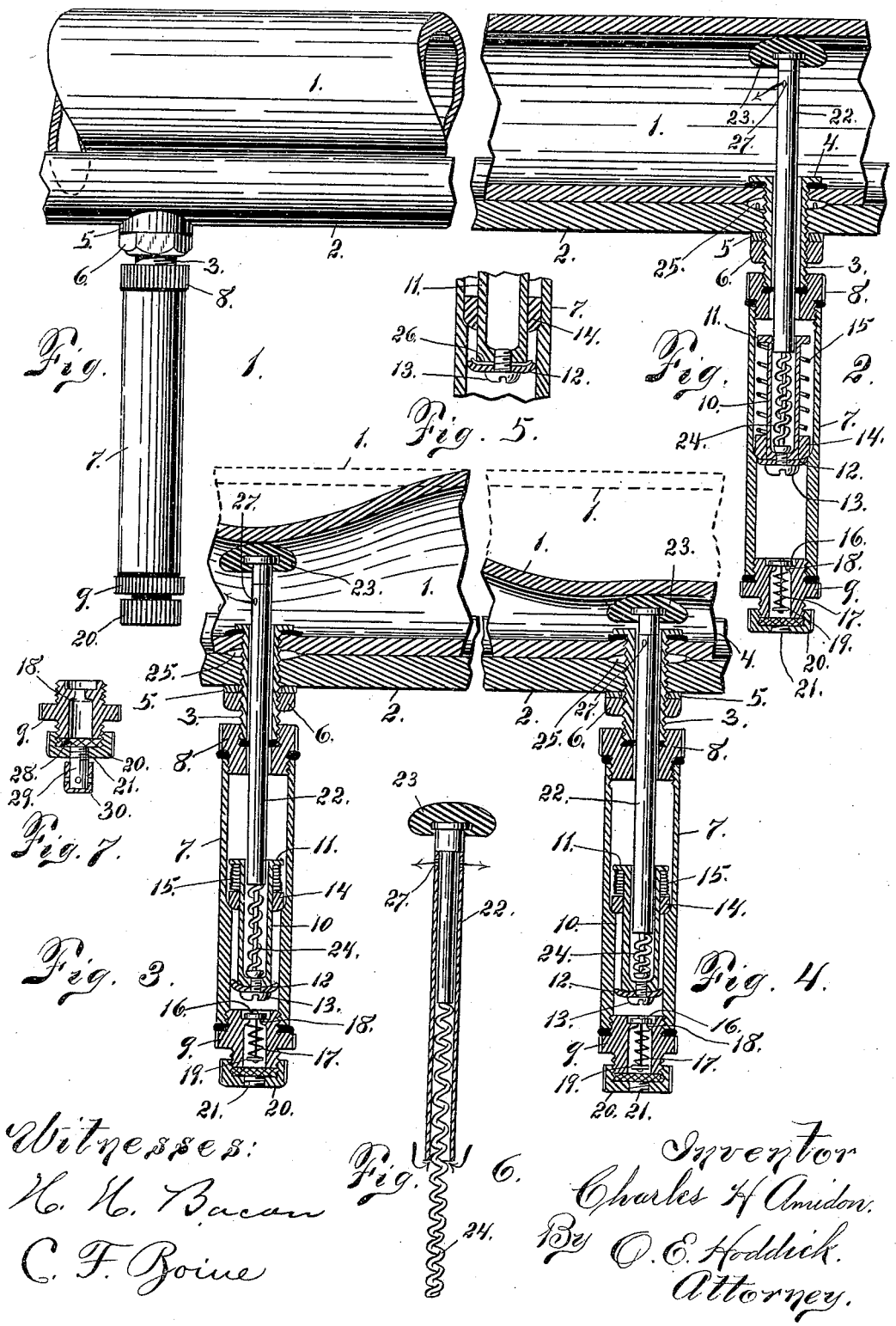

UNITED STATES PATENT OFFICE.

CHARLES H. AMIDON, OF BUFFALO, NEW YORK.

AIR-PUMP FOR PNEUMATIC TIRES.

SPECIFICATION forming part of Letters Patent No. 641,253, dated January 16, 1900.

Application filed May 1, 1899. Serial No. 715,115. (No model.)

*To all whom it may concern:*

Be it known that I, CHARLES H. AMIDON, a citizen of the United States, residing at Buffalo, in the county of Erie and State of New York, have invented certain new and useful Improvements in Air-Pumps; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to improvements in air-pumps, and more particularly to that class of air-pumps employed in inflating pneumatic tires for bicycles and other vehicles. Its object is to produce an air-pump for the purposes as above outlined which is automatic in its operation, is at all times ready for use, is compact in form, and may be attached to most any pneumatic tire, where it becomes self-operative as the tire becomes uninflated (by a partial escape of air) and inoperative when the tire is fully inflated.

To that end it consists in a cylinder-pump provided with particularly-arranged piston, piston-rod, valves, &c., the cylinder being rigidly secured to the rim of the wheel and sealed to the tire, into which the piston-rod protrudes.

My invention further consists in other details of its construction and combination of its operative parts, all of which I will now proceed to definitely describe and then point out in the claims that which I believe to be novel.

In the drawings, Figure 1 is a detail view of a tire and rim equipped with my improved pump. Fig. 2 is a similar view showing the pump in vertical section with piston-rod or plunger at outward end of stroke. Fig. 3 is a similar vertical section showing tire depressed sufficient to carry the piston or plunger to the inward end of the stroke. Fig. 4 is a similar vertical section in which the plunger is shown as forced down beyond the inward end of the stroke, for the purpose as will be hereinafter described. Fig. 5 is a detail sectional view showing the manner of mounting the suction-valve. Fig. 6 is a detail view of the piston-rod or plunger. Fig. 7 is a detail view showing the application of an adjustable air-cap.

Referring to the drawings, 1 is the tire, and 2 the rim. Rigidly secured to the tire and rim is the short sleeve 3, having the annular flange 4 at its inner end and being screw-threaded, as shown in the drawings.

5 is a washer which is placed over the sleeve 3, its inner face fitting the rim 2. A securing-nut 6 is threaded over the sleeve 3 and against the washer 5, thus securely holding the sleeve 3 in place. To insure an air-tight joint where the threaded sleeve 3 enters the tire 1, a thin disk-nut 25 is threaded over the sleeve 3, so as to firmly bind the tire between the nut 25 and flange 4 of said sleeve 3.

7 is the pump-cylinder, provided with the cylinder-heads 8 and 9, which are threaded into the cylinder, as seen in the drawings. The head 8 is threaded over the end of the sleeve 3, thus connecting the pump with the sleeve.

The piston consists of the short sleeve 10, having the annular flange 11 at one end and flexible washer 12 at the other end. Said washer is preferably made of leather and is secured in place by the screw 13. An annular collar or ring 14 is loosely fitted over the sleeve 10. A coil-spring 15 is also fitted over the sleeve 10, having one of its ends resting against the flange 11 and its other end acting against the ring 14. As will be seen in the drawings, the bore of the cylinder is of larger diameter where it receives the annular ring 14, and as the piston-head reaches the smaller bore the ring 14 is held from further travel.

Intervening between the sleeve 10 and leather washer 12 is a thin plate or washer 26. (See enlarged detail view of these parts, Fig. 5.) This serves to retain the washer 12 in its proper position and prevents its periphery striking the collar 14, which might destroy its effective operation.

Mounted in the head 9 is the small spring-valve 16, which is held into position by the spiral spring 17 acting against the shoulder 18 at one end and the adjustable washer 19 at its other end.

A dust-cap 20 is fitted over the end of the head 9, having the screw-threaded opening 21, through which the air passes to the valve 16, and a porous fabric 27 is placed between said opening 21 and inlet to valve 16, thus causing the air to be drawn through the fabric and in this manner excluding the dust from the pump.

To insure the pump against leakage or back pressure when not in use, an air-tight cap 29 might be threaded into the opening 21, as shown in detail in Fig. 7. This cap consists of the short tube 29, having small inlet-holes, as shown, and over which the cap 30 is fitted, the cap 30 being also provided with small holes, which register with the holes in the tube 29 when it is desired to take air through the pump, and upon a slight turning of the cap 30 the holes in the tube will be effectually closed.

22 is the piston-rod or plunger, which consists of a hollow stem, which is loosely fitted into the sleeve 3 and enters the sleeve 10 at one end, and its other end projects into the tire 1. This end is provided with a pliable end 23, (preferably covered with leather,) so as to preserve the tire from wear and tear from its action against the piston-rod. This head 23 is provided with a pin or shank, which rests loosely within the sleeve 22 and upon a stiff spiral spring 24, which extends to the base of the sleeve 10. The said stiff spiral spring 24 ordinarily acts simply as an extension of the piston-rod 22, which forces the piston-head against the action of the spiral spring 15, the spring 15 being of much less tension than the spring 24, but of sufficient tension to return the piston-rod to its normal position, as seen in Fig. 2, the stiff spring 24 being employed as a protection to the piston-rod 22, which is permitted to be forced into the cylinder (contracting the spring 24) should the tire come in contact with an unusual projection or stone just as the piston-rod reaches its operative position.

Should it be desired to remove the pump from the tire, by disconnecting the head 8 from the sleeve 3 it will be seen that the sleeve or piston 22 may be drawn out with the pump, thus avoiding any displacement of the packing around said sleeve, and the shank secured to the head 23, projecting into the sleeve 3, will retain said head in place until the pump is again attached.

In operation, the parts being assembled as shown in the drawings, the initial air may be pumped into the tire either by forcing it through the threaded opening 21 (by connecting any well-known pump to said opening) or by rapid intermittent depressions of the tire directly opposite the pump-cylinder. After the tire has been partially inflated the rider may mount the bicycle, and at each revolution of the wheel as the tire is depressed at the point where the piston-rod extends into it the rod will be automatically operated until the tire has been fully inflated, and as the inflated tire will not depress by the weight of the rider the pump will cease to operate until sufficient air has escaped from the tire to cause it to again depress, when it will again be fully inflated, as above described. The tire will thus be kept fully inflated at all times, as the pump is brought into immediate action upon the slightest escape of air, and the pressure within the tire may be regulated by the relative position of the piston-rod with the outer periphery of the tire.

Should it be found that a back pressure is formed in the pump by wear and tear of its parts, the telescopic cap 30 is threaded into the opening 21, and when it is desired to pump air into the tire the operator has but to turn the cap so as to have its inlet-holes register with each other until sufficiently inflated, when a slight turn of the cap will exclude any further passage of air through the pump.

It will readily be seen that my arrangement of automatic pump is applicable to other pneumatic vessels without departing from the spirit of my invention—i. e., a pneumatic saddle equipped with my improvement would be operative by the vibrations or jolting of the rider.

Having thus described my invention, what I claim, and desire to secure by Letters Patent, is—

1. In a device of the class described, the combination with a pump barrel or cylinder, of a piston-rod, a sleeve loose on the piston-rod and having a plunger or piston and a flange, a spring interposed between the piston-rod and the plunger, a collar loose on the sleeve which is adapted to engage an abutment on the barrel, and a spring interposed between the flange and the collar.

2. In a device of the class described, the combination with a pump-barrel having an internal abutment, of a hollow piston-rod having air-exits, a stem loosely fitted into and resting against one end of the hollow piston-rod, a spring inside the piston-rod and abutting the end of the stem at one end and extending beyond the end of the piston-rod at the other end, a sleeve loose on the piston-rod and having a piston or plunger, a collar loose on this sleeve which is adapted to engage the interior abutment of the barrel, and a spring bearing on the collar which actuates the sleeve.

3. In a device of the class described, the combination with a pump-barrel, of a cylinder-head therefor having an air-inlet, and a valve controlling said inlet, a dust-cap screwed onto said head, air-filtering material held between the head and dust-cap, an air-inlet tube secured to the cap and provided with inlet-apertures, and a cap provided with inlet-apertures which is adapted to turn on the tube whereby the apertures can be brought into register with the aforesaid apertures or moved out of register therewith.

4. In combination with the herein-described automatic pump for pneumatic tires; the air-inlet cap 30, and cap-tube 29, said cap 30 and tube 29, being provided with registering holes through which air is drawn to the pump, and the cap 30, adapted to be turned so as to close said openings substantially as shown and described.

In testimony whereof I have signed my name to this application in the presence of two subscribing witnesses.

CHARLES H. AMIDON.

Witnesses:
O. E. HODDICK,
WILLIAM H. STEVENS.